June 21, 1955  B. L. MILLS ET AL  2,711,341
UNITARY BODY AND FRAME CONSTRUCTION FOR TOWING TRACTORS
Filed Oct. 28, 1953  2 Sheets-Sheet 1

INVENTORS.
BURTON L. MILLS
GEORGE L. TURNER
BY J. Frederick Bechtel
ATTY.

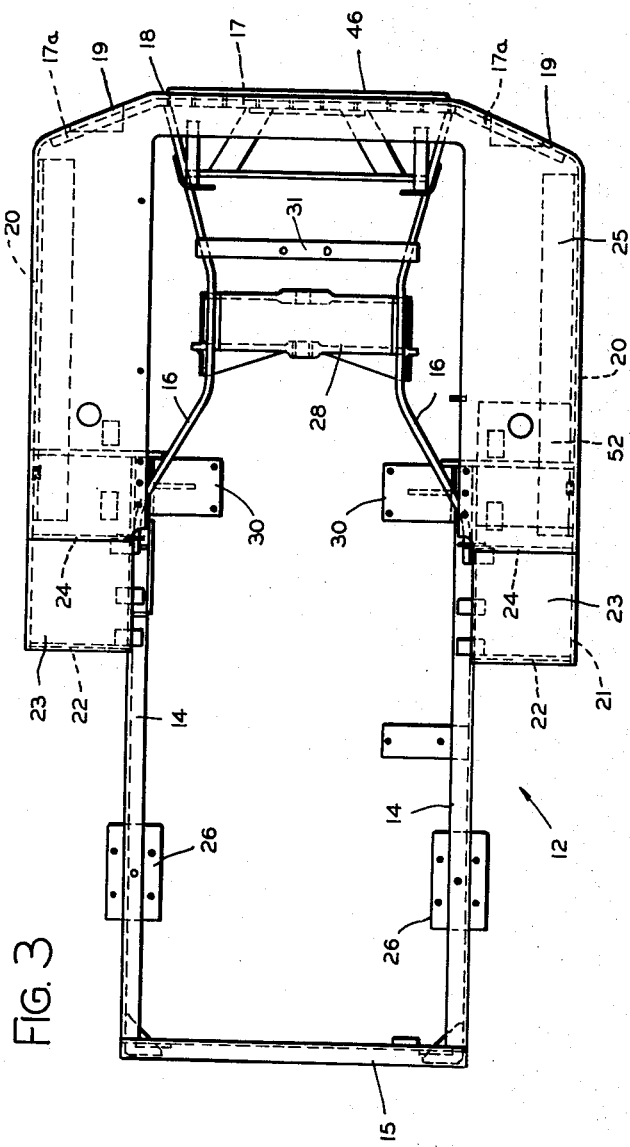
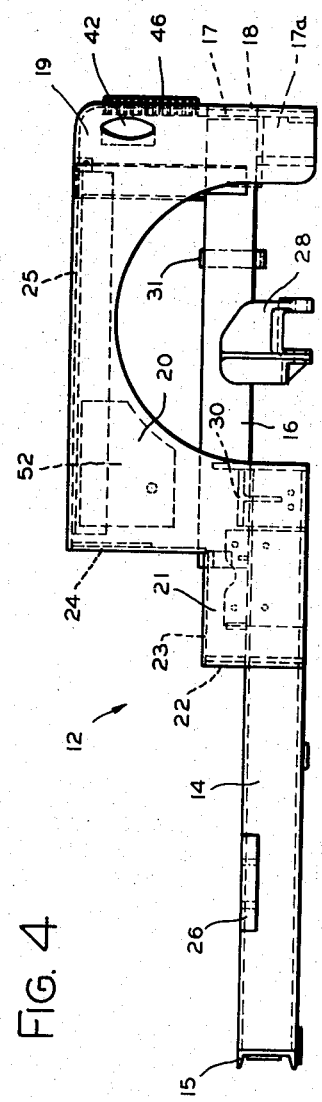

United States Patent Office 2,711,341
Patented June 21, 1955

2,711,341

UNITARY BODY AND FRAME CONSTRUCTION FOR TOWING TRACTORS

Burton L. Mills, Buchanan, and George L. Turner, Battle Creek, Mich., assignors to Clark Equipment Company, a corporation of Michigan Application October 28, 1953, Serial No. 388,735

6 Claims. (Cl. 296—28)

Our present invention relates generally to towing tractors, and, more particularly, is concerned with a unitary body and frame assembly for use in towing tractors.

Towing tractors are employed around warehouses, factories, loading docks, shipyards and airports. Heretofore, the frames of such towing tractors have been arranged to receive substantially all of the stresses imposed upon the tractors and consequently have had to be quite large and bulky. Not only have material costs been high but also fabrication costs. Although trucks of this type are provided with a body, it is employed merely for enclosing working parts.

It is an object of our present invention to provide a unitary body and frame for a tractor wherein the body portion thereof is subject to stress along with the frame portion.

By distributing the stress load between the body and frame portions, it becomes possible to reduce the size and weight of the frame elements without sacrificing sturdiness of the overall tractor. Such unitary construction further facilitates the manufacture of a very compact and streamlined vehicle with a low silhouette. The unitary assembly of our present invention has the added advantage that it may be fabricated from relatively inexpensive standard channel, plate and bar stock which require relatively inexpensive tooling.

In the preferred embodiment of our invention, we provide a pair of longitudinally extending frame units which are interconnected at their rear ends by a transverse member and at their forward ends by a transverse bar member. The bar member has secured to its forward surface vertically extending front plate means from the ends of which extend, in a rearward direction, vertical side plates. Transverse brace members interconnect the rear ends of the side plates and the frame units. Additionally a horizontal generally U-shaped plate member is secured along its outer periphery to the upper edges of the front plate means and side plates. It will be quite clear to those skilled in the art that the plate members which make up the body portion of the tractor share the stress along with the frame units, thus permitting the size of the frame units to be minimized.

It is a feature of our present invention that the cowl and instrument panel unit, which is mounted to the unitary body and frame assembly adjacent the rear end of the horizontal U-shaped plate member, may be easily removed from position to permit ready access to the prime mover, clutch and transmission means of the tractor.

It is another feature of our present invention that the tractor gasoline tanks are detachably mounted to the unitary body and frame assembly in readily accessible convenient locations immediately beneath the U-shaped plate member one next to each of the vertical side plates.

It is still another feature of our present invention that the hood, which is hinged to the unitary body and frame assembly, is reinforced so that it will safely serve as a platform for workmen engaged in maintenance work, for example, in connection with airplanes.

Now, in order to acquaint those skilled in the art with the manner of constructing and using unitary body and frame assemblies in accordance with the principles of our present invention, we shall describe in connection with the accompanying drawings, a preferred embodiment of the invention.

In the drawings:

Figure 3 is a plan view of the unitary body and frame assembly of our present invention; and Figure 4 is a side elevational view of the unitary body and frame assembly of Figure 3.

Figure 1:
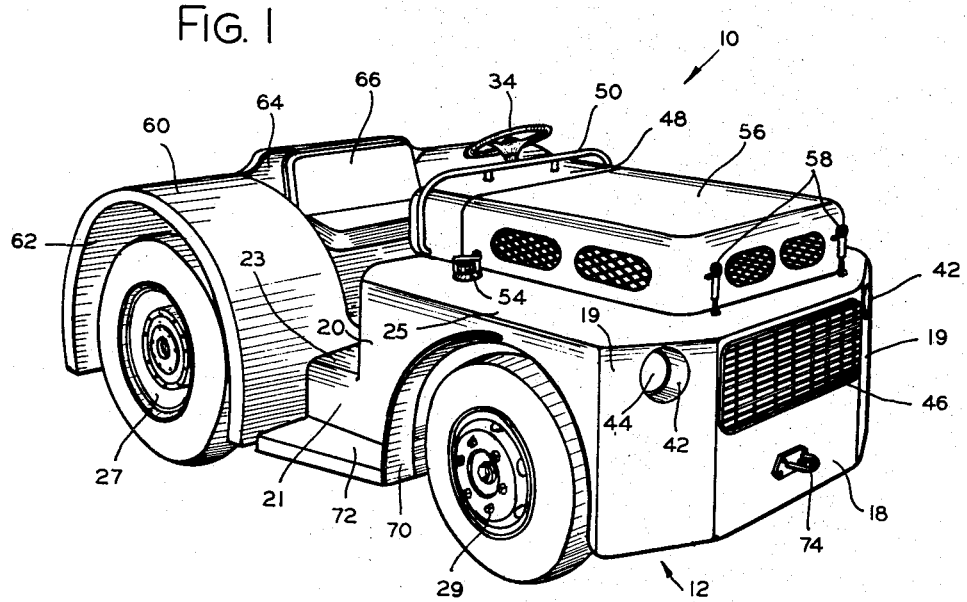
Figure 1 is a perspective view of a tractor in which the present invention is embodied.
Figure 2:
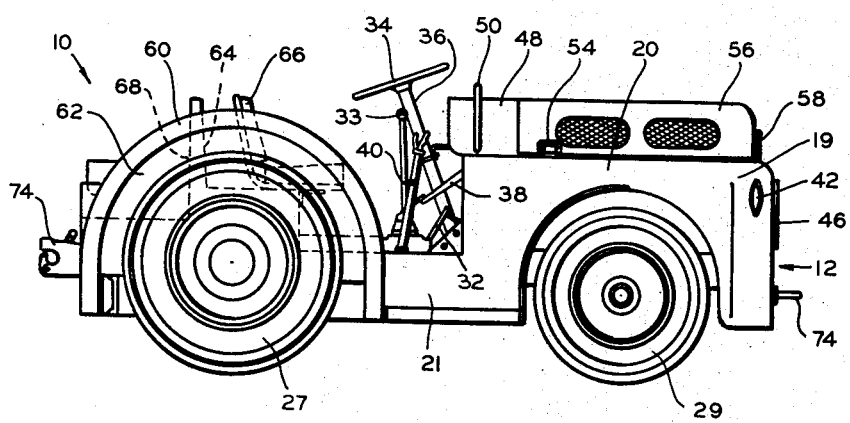
Figure 2 is a side elevational view of the tractor of Figure 1.

Referring now to Figures 1 and 2, there is indicated generally by the reference numeral 10 a towing tractor which embodies the present invention of a unitary body and frame 12. As shown in Figures 3 and 4, the unitary body and frame 12 comprises a pair of transversely spaced, longitudinally extending, parallel, C-shaped, channel members 14. The rear ends of the channel members 14 are interconnected by means of a transverse C-shaped channel member 15. Longitudinally extending, inwardly bowed brace members 16 are secured, as by welding, at their rear ends to the upper surfaces of the forward ends of the channels 14. The forward ends of the brace members 16 are interconnected by means of a transverse bar member 17. As shown bar 17 extends downwardly below members 16 and also has angularly disposed lateral extensions 17a at each side.

The bar member 17 has secured to its forward surface a vertical plate member 18 from the ends of which extend, at an angle, vertical corner plates 19. Corner plates 19 are secured to extensions 17a on bar 17. Plate member 18 and plate members 19 conveniently may be formed from a single metal plate of suitable configuration. The outer ends of the plates 19 have welded thereto the forward ends of parallel, longitudinally extending, vertical plates 20. The rear ends of the plates 20 are formed with extensions 21 which are welded to inwardly extending, transverse braces 22 secured to the outer vertical surfaces of the channel members 14. Inwardly extending platforms 23 are secured to the upper horizontal edges of the extensions 21, and inwardly extending, transverse braces 24 are secured to the plates 20. The braces 22 and 24 and the platforms 23 are welded along their adjacent edges. A horizontal, generally U-shaped, plate member 25 is secured, as by welding, at its outer periphery, to the upper edges of the plates 18, 19, 20 and 24.

The afore-described elements of our present invention, when in assembled relation, provide a unitary body and frame wherein the body portion of the assembly is subject to stress, along with the frame portion, thereby permitting smaller and more compact frame elements to be employed than heretofore has been possible in tractors having comparable capacity.

We shall now describe the relationship between the unitary body and frame and the other elements of the tractor 10.

Welded to the channel members 14 toward the rear ends thereof are horizontal gusset plates or platforms 26 to which is secured a transverse rear drive axle housing (not shown) having dual wheel and tire assemblies 27 mounted at the ends thereof as shown in Figures 1 and 2. A transverse frame member 28 is welded at its ends to the brace members 16 intermediate of the ends thereof. The frame member 28 provides support for a transverse forward steering axle assembly (not shown) having steering wheel and tire assemblies 29 mounted at the ends thereof as shown in Figures 1 and 2. The side plates 20 are cut away to accommodate the wheel and tire assemblies 29.

Carried at the forward ends of the channel members 14 are inwardly directed platforms 30 which, together with a generally U-shaped transverse strap member 31 secured at its ends to the brace members 16 close to their forward ends, supports the prime mover means of the tractor 10.

The prime mover means (not shown) may comprise an internal combustion engine controlled by a foot throttle 32, shown in Figure 2, and has driving connection with the rear drive axle through a clutch, and a transmission controlled by a gear shift lever 33. The tractor 10 is steered by means of the forward steering axle assembly which has connection with a hand steering wheel 34 mounted at the upper end of a steering column 36. Braking of the wheel assemblies is effected through actuation of either a foot pedal 38 or a hand brake lever 40.

The corner plates 19 have openings 42 cut therein through which light from headlamps 44 may project. A generally rectangular opening is also formed in the front plate 18 and laid across this opening is a grill 46, through which air may be drawn for the internal combustion engine cooling system.

A transversely extending cowl and instrument panel assembly 48 is detachably mounted to the unitary body and frame assembly adjacent the rear ends of the plates 20 and 25 and when removed from the position shown in Figures 1 and 2 permits access to be had to the internal combustion engine, clutch and transmission means. A hand grip bar 50 extends across the top of the cowl assembly 48 and down the sides thereof.

At either side of the tractor 10, immediately beneath the plate 25 and next to the plates 20, fuel tanks 52 are detachably mounted to the unitary body and frame assembly by means of strap members. Fuel tank inlet tubes extend upwardly through the plate 25 and have caps 54 fastened thereon.

As shown in Figures 1 and 2, a cover member or hood 56 extends forwardly from the cowl assembly 48 and serves to enclose the central opening in the plate 25. The cover member 56 is hinged at its rear end on the unitary body and frame assembly, so that it may be raised for inspection of the engine and for servicing the same with water and oil, and is provided with fastening means 58 for maintaining it in a closed position. The underside of the cover member 56 is reinforced with ribs so that it will safely serve as a platform for workmen engaged in maintenance work, for example, in connection with airplanes.

Secured across the tractor at the rear end thereof is a large one-piece counterweight casting 60 which, at its sides has wheel wells 62 formed therein for receiving the wheel and tire assemblies 27. The counterweight 60, at its forward end, is stepped at 64 to accommodate a driver's seat 66, and, at its rear end, is stepped at 68 to accommodate either an auxiliary two-man seat or a winch assembly. In addition, fender extensions 70 and running boards 72 are secured to the outward sides of the plates 20, while coupling members 74 are secured to the truck at the forward and rear ends.

It will be apparent from this description that we have provided a very simple and compact type of tractor construction wherein the drive means, counterweight and accessories are supported by a unitary body and frame assembly, without the necessity of an auxiliary chassis.

Now, while we have shown and described what we believe to be a preferred embodiment of our present invention, it will be understood that various rearrangements and modifications may be made therein without departing from the spirit and scope of our invention.

We claim:

1. For use in an industrial tractor, a unitary body and frame wherein the body portion thereof is subject to stress along with the frame portion comprising a pair of longitudinally extending frame units, said frame units being adapted to have secured thereto counterweight means and rear drive axle means, a transverse member interconnecting the rear ends of said frame units, a bar member interconnecting the forward ends of said frame units, vertically extending front plate means secured to the forward surface of said bar member, parallel vertical side plates secured to and extending rearwardly from said front plate means, transverse brace members interconnecting the rear ends of said side plates and said frame units, a horizontal plate member secured along its outer periphery to the upper edges of said front plate means and side plates, a transversely extending front steering axle assembly supporting frame secured at its ends to said frame units, inwardly extending platforms carried by said frame units intermediate of the ends thereof, a transverse strap member secured at its ends to said frame units forwardly of said platforms, and said platforms and strap member being adapted to support the tractor drive means.

2. For use in an industrial tractor, a unitary body and frame wherein the body portion thereof is subject to stress along with the frame portion comprising a pair of transversely spaced longitudinally extending parallel frame members, a transverse member interconnecting the rear ends of said frame members, longitudinally extending inwardly bowed brace members secured at their rear ends to the forward ends of said frame members, a bar member interconnecting the forward ends of said brace members, a vertical front plate secured to the forward surface of said bar member, vertical corner plates extending angularly rearwardly from the ends of said front plate, parallel vertical side plates secured to and extending rearwardly from said corner plates, transverse brace members interconnecting the rear ends of said side plates and said frame members, and a horizontal plate member secured along its outer periphery to the upper edges of said front and corner and side plates.

3. For use in an industrial tractor, a unitary body and frame wherein the body portion thereof is subject to stress along with the frame portion comprising a pair of transversely spaced longitudinally extending parallel frame members, said frame members being adapted to have secured thereto counterweight means and rear drive axle means, a transverse member interconnecting the rear ends of said frame members, longitudinally extending inwardly bowed brace members secured at their rear ends to the forward ends of said frame members, a bar member interconnecting the forward ends of said brace members, a vertical front plate secured to the forward surface of said bar member, vertical corner plates extending angularly rearwardly from the ends of said front plate, parallel vertical side plates secured to and extending rearwardly from said corner plates, transverse brace members interconnecting the rear ends of said side plates and said frame members, a horizontal plate member secured along its outer periphery to the upper edges of said front and corner and side plates, a transversely extending front steering axle assembly supporting frame secured at its ends to said inwardly bowed brace members intermediate of the ends thereof, inwardly extending platforms carried by said frame members at the forward ends thereof, a transverse strap member secured at its ends to said inwardly bowed brace members, and said platforms and strap member being adapted to support the tractor drive means.

4. For use with an industrial tractor, a unitary body and frame wherein the body portion thereof is subject to stress along with the frame portion comprising a pair of longitudinally extending frame units, a transverse member interconnecting the rear ends of said frame units, a bar member interconnecting the forward ends of said frame units, vertically extending front plate means secured to the forward surface of said bar member, parallel vertical side plates secured to and extending rearwardly from said front plate means, transverse brace members interconnecting the rear ends of said side plates and said frame units, a horizontal plate member secured along its outer periphery to the upper edges of said front plate means and side plates, and a transversely extending cowl and instrument panel assembly mounted to said unitary body and frame assembly adjacent the rear ends of said side and horizontal plates and detachable therefrom to permit access to be had to the drive means of the tractor housed within the confines of said unitary body and frame assembly.

5. For use in an industrial tractor, a unitary body and frame wherein the body portion thereof is subject to stress along with the frame portion comprising a pair of longitudinally extending frame units, a transverse member interconnecting the rear ends of said frame units, a bar member interconnecting the forward ends of said frame units, vertically extending front plate means secured to the forward surface of said bar member, parallel vertical side plates secured to and extending rearwardly from said front plate means, transverse brace members interconnecting the rear ends of said side plates and said frame units, a horizontal generally U-shaped plate member secured along its outer periphery to the upper edges of said front plate means and side plates, a cover member normally enclosing the central opening in said U-shaped plate member and being hinged to said unitary body and frame assembly, and said cover member being reinforced so that it will safely serve as a platform for workmen engaged in maintenance work.

6. For use in an industrial tractor, a unitary body and frame wherein the body portion thereof is subject to stress along with the frame portion comprising a pair of longitudinally extending frame units, a transverse member interconnecting the rear ends of said frame units, a bar member interconnecting the forward ends of said frame units, vertically extending front plate means secured to the forward surface of said bar member, parallel vertical side plates secured to and extending rearwardly from said front plate means, transverse brace members interconnecting the rear ends of said side plates and said frame units, a horizontal plate member secured along its outer periphery to the upper edges of said front plate means and side plates, and means for detachably mounting at least one tank to said unitary body and frame assembly immediately beneath said horizontal plate member next to one of said vertical side plates.

References Cited in the file of this patent

UNITED STATES PATENTS

| | | |
|---|---|---|
| 1,948,802 | Schroeder | Feb. 27, 1934 |
| 2,226,027 | Stoner | Dec. 24, 1940 |
| 2,477,789 | Dunham | Aug. 2, 1949 |
| 2,570,319 | Cassady | Oct. 9, 1951 |

FOREIGN PATENTS

| | | |
|---|---|---|
| 598,539 | Great Britain | Feb. 20, 1948 |